US010051165B2

(12) United States Patent
Sperber

(10) Patent No.: US 10,051,165 B2
(45) Date of Patent: Aug. 14, 2018

(54) FILTER DEVICE FOR A CAMERA

(71) Applicant: Arnold & Richter Cine Technik GmbH & Co. Betriebs KG, Munich (DE)

(72) Inventor: Timo Sperber, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 15/610,285

(22) Filed: May 31, 2017

(65) Prior Publication Data

US 2017/0272628 A1 Sep. 21, 2017

Related U.S. Application Data

(63) Continuation of application No. 14/472,271, filed on Aug. 28, 2014, now Pat. No. 9,699,362.

(51) Int. Cl.
| *H04N 5/225* | (2006.01) |
| *G03B 17/14* | (2006.01) |
| *G02B 7/00* | (2006.01) |
| *G03B 17/56* | (2006.01) |
| *G03B 11/00* | (2006.01) |
| *G03B 17/12* | (2006.01) |
| *G02B 26/00* | (2006.01) |

(52) U.S. Cl.
CPC ............ *H04N 5/2254* (2013.01); *G02B 7/005* (2013.01); *G02B 7/006* (2013.01); *G03B 11/00* (2013.01); *G03B 17/12* (2013.01); *G03B 17/14* (2013.01); *G03B 17/566* (2013.01); *G02B 26/007* (2013.01)

(58) Field of Classification Search
CPC ........ G03B 17/12; G03B 17/14; G03B 11/00; G02B 7/006; G02B 26/007; G02B 26/023; H04N 5/2254
USPC .................................................. 348/342, 374
See application file for complete search history.

(56) References Cited

U.S. PATENT DOCUMENTS

| 7,157,690 B2* | 1/2007 | Nishiwaki ......... H01L 27/14623 250/208.1 |
| 7,158,323 B2 | 1/2007 | Kim |
| 7,738,199 B1 | 6/2010 | Wen |
| 8,248,692 B2 | 8/2012 | Wu |
| 9,578,219 B2* | 2/2017 | Wang .................. H04N 5/2354 |

(Continued)

FOREIGN PATENT DOCUMENTS

| CN | 2682447 Y | 3/2005 |
| CN | 2682449 Y | 3/2005 |

(Continued)

OTHER PUBLICATIONS

German Search Report dated Apr. 23, 2014.

*Primary Examiner* — Ngoc-Yen Vu
(74) *Attorney, Agent, or Firm* — Amster, Rothstein & Ebenstein LLP

(57) ABSTRACT

A filter device for a camera which has an optical path, comprises at least one filter unit which has an actuation device and at least one first filter element and one second filter element. The actuation device has a holding device which can be magnetically coupled to the first and to the second filter element and which can be displaced linearly to bring the filter elements selectively into the optical path of the camera or to move them out of the optical path of the camera.

20 Claims, 3 Drawing Sheets

(56) References Cited

U.S. PATENT DOCUMENTS

| | | |
|---|---|---|
| 9,814,370 B2 * | 11/2017 | Kang ................ A61B 1/00186 |
| 2007/0154208 A1 | 7/2007 | Chen |
| 2007/0264006 A1 | 11/2007 | Huang |
| 2007/0291157 A1 | 12/2007 | Ding et al. |
| 2008/0143868 A1 | 6/2008 | Tsuchiya |
| 2011/0036982 A1 | 2/2011 | Chiang |
| 2014/0078350 A1 | 3/2014 | Aoki |
| 2015/0334316 A1 | 11/2015 | Wang |

FOREIGN PATENT DOCUMENTS

| | | |
|---|---|---|
| CN | 1987630 A | 6/2007 |
| CN | 200944174 Y | 9/2007 |
| CN | 201438235 U | 4/2010 |
| JP | 2004-343614 A | 12/2004 |
| JP | 2012-027206 A | 9/2012 |
| WO | 2009140830 A1 | 11/2009 |

* cited by examiner

FILTER DEVICE FOR A CAMERA

The present invention relates to a filter device for a camera which has an optical path, comprising at least one filter unit which has an actuation device and at least one first filter element and one second filter element.

Light of a scene to be recorded can enter into the camera along the optical path of a camera and can there be imaged on film or onto an image sensor. In this respect it can be useful for different purposes to filter the light entering into the camera and thus to prevent the whole radiation emanating from the scene from being incident on the film or on the image sensor.

The filtering can, for example, comprise that unwanted spectral ranges are filtered by a respective filter (e.g. by using an infrared band-elimination filter) and/or only specific spectral ranges of the radiation are transmitted (whereby a recorded image can be tinted depending on the filter used). Alternatively, polarization filters can be used in order directly to darken unwanted reflections, for example light reflected from water surfaces or specific scattered light portions of a blue sky. So-called ND (neutral density) filters are in particular also used whose property is to reduce the radiation intensity substantially uniformly over the whole detected spectral range.

The brightness of an image taken by a camera is substantially determined, for a given brightness of the imaged scene, by the exposure time, the aperture and the sensitivity of the film or the sensitivity (amplification) of the image sensor. In this respect, these camera parameters not only influence the brightness, but are also used directly for different effects. Motion blur, which may be unwanted or which may be used directly, in particular for moving image shots, for soft transitions between the individual images, thus primarily depends on the exposure time, for instance. The depth of field can be determined by the size of the aperture. The sensitivity of the film or of the image sensor has an effect on the noise in the image. However, due to their effect on the image brightness, these effect could not be combined as desired with one another since this could result in overexposures or underexposures.

However, the flexibility in the use of these effects can be increased by the use of ND filters. For an otherwise over-exposed image can be uniformly darkened by means of an ND filter of suitable power so that, for example, an overexposure due to an aperture selected as too large for a small depth of field can be compensated. The more ND filters of different intensities are available, the greater the flexibility in the setting of the named camera parameters.

Generally, filters of all types can substantially increase the creative leeway for a camera shot. In this respect, the filters can be introduced into the optical path of a camera in different manners. For example, they can, for instance, be arranged as accessories separate from the camera at the inlet side or at the outlet side of an objective or in its interior space. It is also possible to install or remove different filters selectively into or out of the camera body respectively.

The disadvantage on the use of such filters separate from the camera is that they have to be carried along as accessories and may be lost. In addition, a large surface of the filter is necessary on an arrangement of a filter at the objective inlet. Separate filters furthermore have to be sufficiently rugged for their handling, which makes a relatively large thickness necessary and thus has a negative effect on the optical quality (larger optical distance). The problem of unwanted light reflections can also occur in this arrangement.

It is therefore noted as an alternative to separate filters to install different filters as a part of a filter device into a camera and to introduce it selectively into the optical path of the camera by means of an actuation device. For this purpose, the filters can, for example, be arranged as segments of a rotary disk. Such a rotary disk, however, requires a comparatively large amount of room as a circular area. In addition, there is generally the risk with such filter devices that abrasion arises at parts of the actuation device, such as toothed wheels, threaded bars, joints, springs or the like, and said abrasion can be deposited as a contaminant onto the filters and in the worst case can be deposited on the film or on the image sensor.

It is therefore an object of the invention to provide a filter device for a camera which is suitable to introduce filters selectively into the optical path of the camera, which is simultaneously particularly compact in this respect and which efficiently prevents contaminants.

The object is satisfied by a filter device having the features of claim 1 and in particular in that the actuation device has a holding device which can be magnetically coupled to the first filter element and to the second filter element, wherein the holding device can be displaced linearly to bring the filter elements selectively into the optical path of the camera or to move it out of the optical path of the camera.

The drive of a respective filter element to bring it selectively into the optical path of the camera therefore takes place via an actuation device which has a linearly displaceable holding device. The linear displacement path of the holding device can in particular be aligned perpendicular to the extent of the optical path through the filter device, i.e. the displacement path of the holding device lies within a plane which is aligned perpendicular to the optical axis of the camera. The filter device can be configured as particularly compact due to the linear displacement path.

The first and second filter elements can each be magnetically coupled to the holding device. This in particular has the purpose that the displacement movement of the holding device can be transferred to an adjustment movement of a respective filter element—of an individual filter element or of both filter elements at the same time. The holding device and a respective filter element can therefore be magnetically coupled to make a common movement, i.e. a displacement of the holding device can result in an adjustment of a respective filter element. A magnetic coupling can furthermore advantageously be used to decouple the holding device and the filter elements selectively from one another in a simple manner to be able to use the holding device more flexibly.

Due to the magnetic coupling, a mechanical coupling between the holding device and the respective filter elements advantageously becomes superfluous. Mechanical abrasion between the holding device and the filter elements can thus be prevented. In addition, there is the possibility to screen the actuation device and the filter elements from one another, for example, by an encapsulation of the actuation device and/or of the filter elements, and thus to protect the filter elements from contaminants which can also in particular emanate from the actuation device.

The fact furthermore contributes to the compact design of the filter unit that a separate holding device is not required for each of the filter elements, but that rather a common holding device can be provided for a plurality of filter elements of a filter unit. In this respect, the holding device can be simultaneously magnetically coupled to both filter elements at least in an operating state. The introduction of a respective filter element into the optical path and the moving of a respective filter element out of the optical path then takes place for the filter elements by means of the displacing of the same holding device.

For example, the first filter element and the second filter element can be arranged in a fixed relative arrangement with respect to one another, for instance by means of a common frame and can be displaced together by the holding device. Either the first filter element or the second filter element or none of the filter elements can then be introduced into the optical path of this camera by this linear displacing. In this respect, the two filter elements can, for instance, leave a free space between them, whose dimensions correspond to a further filter element, or can be directly adjacent to one another. In the first-named case, a construction space length of the filter device of at least five filter elements would be required solely for the movement of the filter elements fixedly connected to one another, as will be explained further below with respect to FIG. 1A. In contrast, the last-named arrangement offers the advantage that only a construction space length of at least four filter elements is required for the total displacement path of the two filter elements, as will be explained further below with respect to FIG. 1B.

The required construction space length can, however, be reduced still further if the first filter unit and the second filter unit are not fixedly arranged relative to one another, but are movable independently of one another and are nevertheless displaced by the same holding device. Such an embodiment will be explained in more detail in the following.

At least one operating state is preferably provided for the filter device, in which operating state the first filter element is introduced into the optical path of the camera; furthermore an operating state in which the second filter element is introduced into the optical path of the camera; and an operating state in which neither the first filter element nor the second filter element are introduced into the optical path of the camera.

The filter elements can, for example, be color filters, polarization filters and/or ND filters. One of the filter elements can in particular also be a clear glass filter element, with the radiation remaining at least substantially unfiltered on passing through it. The configuration of one of the filter elements as a clear glass filter element can serve to maintain the optical distance on a change of the respective filter element introduced into the optical path. A change of the optical distance could namely result in imaging errors, in particular with beams not conducted in parallel.

For example with a filter device having a plurality of filter units, always a total of exactly one filter element can be introduced into the optical path so that the thickness of only one filter elements thus contributes to the optical distance of the optical path. If no filtering should take place in total with such a filter device, just that filter element is introduced into the optical path which only has clear glass.

In accordance with a preferred embodiment, the first filter element and the second filter element—as already mentioned—are encapsulated in a housing which is closed at least with respect to the actuation device to prevent the penetration of dust particles or contaminant particles into the space taken up by the filter elements. The space provided for the filter elements can in particular be hermetically sealed, i.e. closed in an airtight manner. The walls of the housing provided in the optical path of the camera naturally have to be permeable for the radiation which should be captured by means of the film or of the image sensor of the camera.

Such an encapsulation of the filter elements in particular serves for the protection of the filter elements from contaminants. A contamination of the filter elements is not only threatened generally by dust and other particles which can penetrate into the camera, but can in particular be caused by abrasion of the parts of the actuation device connected to one another in a drive-effective manner. Provided that a filter unit has more than two filter elements or that the filter device has a plurality of filter units having respective filter elements, all filter elements of the filter device can preferably be encapsulated in a common housing closed with respect to the respective actuation devices.

The magnetic coupling of the filter elements to the respective holding devices takes place beyond walls of the closed housing. For example, the housing can have thin side walls of plastic through which the magnetic coupling acts. The filter elements and in particular the coupling magnets of the filter elements provided for the magnetic coupling preferably have no contact with the walls of the housing so that no abrasion can occur between the coupling magnets and the inner side of the housing walls. It is furthermore preferred if the filter elements are movably supported along their respective displacement paths with especially low friction so that where possible no abrasion also takes place on the bearing. Components of the filter device and/or of the camera anyway present can be integrated into the walls of the housing. For example, a cover glass can be provided at the front side of the encapsulation at which the optical path penetrates, whereas an optical low-pass filter, UV filter, IR filter or the image sensor itself can close the encapsulation at the rear side (facing the film or the image sensor).

In accordance with an advantageous further development, the filter device can form, in particular due to the explained encapsulation in a housing, a compact, closed construction unit which has a particularly simple exchangeability. This construction unit can also comprise a low-pass filter, a UV filter and/or an IR filter and optionally also the image sensor of the camera. The exchange of such a construction unit is in this respect simplified, on the one hand, in that a large number of individual parts do not have to be removed or inserted, but rather only the named closed construction unit. On the other hand, the encapsulation of the filter elements is also maintained on the exchange so that a contamination of the filter elements, and optionally of the named further filters or of the image sensor, can be reliably avoided.

In accordance with a particularly simple embodiment, the actuation device of the filter device is configured purely mechanically, for example as a pushing mechanism or as a pulling mechanism, optionally with a spring preload. In this embodiment, the linear displacing of the holding device is therefore effected manually. The holding device can, for example, have an actuation arm projecting out of the camera housing for this purpose. It is, however, preferred if the actuation device has an electrically controllable drive device.

The actuation device can in particular have an electric motor, with the holding device being able to be displaced by means of the electric motor. The drive of a respective filter element to bring it selectively into the optical path of the camera therefore takes place in this embodiment via an electric motor which can, on the one hand, supply the required forces to move the filter elements and can, on the other hand, be controlled with sufficient accuracy. The movement of this motor is in this respect not transferred directly to the filter elements, but rather by means of the holding device which can be moved linearly by the motor.

Since the actuation device has an electric motor, a particularly precise drive of the filter elements is possible. In this respect, means such as a rotary encoder can in particular also be provided for monitoring the position of the motor or of the speed of the motor. In addition, an electric motor offers the possibility of a remote control, for example in that control signals are generated by means of a remote control device and can be transferred in a wired or wireless manner to a control device for the electric motor.

In an advantageous embodiment, the actuation device furthermore has a reduction gear which is provided between the electric motor and the holding device. The use of a reduction gear provides the advantage that fast-rotating electric motors which can be of a particularly small design can be used in the actuation device. A high positioning accuracy of the holding device can additionally be achieved by the reduction since the adjustment of the electric motor can be transferred to a smaller scale.

In accordance with a further development, the reduction gear has a threaded spindle which can be driven to make a rotational movement by means of the electric motor, with the holding device being supported movably, but rotationally fixedly, in parallel with the axis of rotation of the threaded spindle and having an internal thread located in engagement with the threaded spindle. The rotational movement of an electric motor can be converted to a linear displacing of the holding device in a particularly simple manner by means of such a reduction gear. The rotation of the electric motor can in this respect be transmitted to the named threaded spindle directly or indirectly in this respect so that the threaded spindle rotates about its axis. The cooperation of the threaded spindle with the internal thread of the holding device then has the result that the holding device is moved axially relative to the threaded spindle in dependence on the number of revolutions of the threaded spindle. The threaded spindle itself is in this respect unmovably supported in the axial direction so that the holding device is moved linearly along the extent of the threaded spindle.

Alternatively to the use of a threaded spindle, a cable control or a toothed belt can be provided between the electric motor (or another drive device) and the holding device for the filter elements. In this embodiment, a drive movement (e.g. a rotation of an output element of an electric motor) is therefore transferred via a cable control or a toothed belt to the holding device, whereby a clearance-free and thus positionally accurate bidirectional adjustment movement of the holding device is possible. The holding device can, for example, be guided along one or more sliding bars so that the holding device can maintain a linear displacement path in this respect.

In accordance with a further advantageous embodiment, the magnetic coupling between the holding device and the respective filter element can be selectively releasable in the (manual or electrically controlled) operation of the filter device. A direct decoupling of the holding device from one of the filter elements can thus be brought about during the use of the filter device to be able to use the holding device more flexibly, for example in that different elements are displaced selectively by means of the holding device.

It is furthermore preferred if the possible displacement path of the filter elements is selected as shorter than the maximum displacement path of the holding device so that the magnetic coupling between the holding device and the respective filter element can be selectively released by displacing the holding device beyond the possible displacement path of one of the filter elements. A direct decoupling of the holding device from one of the filter elements can hereby be brought about in a particularly simple manner, for example to displace only one other filter element, while the one filter element remains in a desired position.

In accordance with this embodiment, a respective filter element is consequently not magnetically coupled to the holding device in every operating state of the holding device. This magnetic coupling is rather selectively releasable. The fact is utilized in this respect that a magnetic coupling of two elements is dependent on the spacing of the elements from one another. The respective filter element and the holding device can only be magnetically coupled to one another to make a common movement in the region in which the displacement path of the holding device and the displacement path of the respective filter element overlap one another or at least run next to one another. If the holding device is displaced beyond this region, the respective filter elements cannot follow the movement so that the spacing between the holding device and the respective filter element increases, which produces a release of the magnetic coupling.

The first and second filter elements preferably have different possible displacement paths which can in particular be offset from one another with the same length. It thus depends on the position of the holding device along its displacement path whether the holding device can be magnetically coupled to the first filter element, to the second filter element or to both filter elements simultaneously. In this manner, the magnetic decoupling caused by the bounding of the displacement path of a respective filter element can advantageously be directly used selectively to move only one of the two filter elements or both filter elements simultaneously by the holding device. This selectability of the coupling of the holding device to one or more of the filter elements is characterized by a particularly low technical complexity.

In accordance with a further development, the possible displacement path of the respective filter element is bounded by at least one abutment at an end of the movement path of the filter element, i.e. the end of the displacement path of the filter element is defined by an abutment device. Such a mechanical abutment is particularly simple to implement from a construction aspect. The limitation of the displacement path can additionally satisfy two functions: on the one hand, the release of the magnetic coupling between a respective filter element and the holding device can be effected by the limitation; on the other hand, the limited displacement path of the respective filter elements allows a particularly compact construction shape of the filter device.

A particularly small construction space length for the displacement path of the two filter elements can be achieved, for example, in that the first filter element can only be displaced between a position directly beneath the optical path and a position within the optical path, while the second filter element can only be displaced between a position directly above the optical path and a position within the optical path. The required construction space length can be reduced to three filter elements by such an arrangement and limitation of the respective displacement path of the filter elements.

Here as also in the following, for reasons of simplicity, terms such as "up"/"above" or "down"/"beneath" are used for the indication of two alignments disposed diametrically opposite relative to the optical path. Such indications of direction naturally depend on the alignment of the filter device and in particular also on the alignment of the camera. In principle, other alignments such as to the left or right of the optical path should also equally be covered by these terms.

Provision is made in a further embodiment that the holding device has a first holding magnet and a second holding magnet, wherein the first filter element has a coupling magnet and the second filter element likewise has a coupling magnet, wherein the first holding magnet can be coupled to the coupling magnet of the first filter element and the second holding magnet can be coupled to the coupling magnet of the second filter element. Coupling is in this respect in particular to be understood such that the coupling magnet of a filter element to the respective holding magnet of the holding device is brought into sufficiently close spatial proximity that a displacing of the holding device can produce a movement of the filter element due to the magnetic interaction between the magnets.

Both the named coupling magnets and the first and second holding magnets can each also be arrangements of a plurality of magnets. The power of the magnet can, for instance, be increased by such an arrangement of a plurality of individual magnets. In addition, by a specific alignment of the magnetic poles of the plurality of magnets, a type of encoding for an arrangement complementary thereto can be generated on the oppositely disposed element to be coupled so that only mutually matching arrangements couple to one another. The holding magnets and/or coupling magnets can, for example, be permanent magnets, whereas the respective other magnets can also be induced magnets. All named magnets are advantageously permanent magnets, in particular neodymium magnets.

In an advantageous further development, the spacing between the first holding magnet and the second holding magnet of the holding device corresponds to a spacing between the coupling magnet of the first filter element and the coupling magnet of the second filter element when an operating state is present in which the first filter element and the second filter element are arranged outside the optical path of the camera on oppositely disposed sides of the optical path.

In this operating state, neither the first nor the second filter element are thus introduced into the optical path of the camera, but rather both filter elements are located outside the optical path. Since the spacing between the coupling magnet of the first filter element and the coupling magnet of the second filter element in this operating state just corresponds to the spacing between the two holding magnets of the holding device, the holding device in this operating state can be simultaneously magnetically coupled to the first filter element and to the second filter element to be able to displace a respective filter element.

It is possible in this respect that, starting from this operating state, both the first filter element and the second filter element can be displaced, in particular into the optical path, but not both filter elements simultaneously. For example, depending on the direction in which the holding device is displaced out of this operating state, either the first filter element or the second filter element can be moved into the optical path. In this respect, a decoupling of the holding device from the respective other filter element preferably simultaneously takes place so that this other filter element is in this respect not likewise moved.

Provision can furthermore be made that the first filter element and the second filter element are arranged in a common positional plane. The first filter element and the second filter element of the same filter unit of a filter device in accordance with the invention can therefore, in accordance with this embodiment, not be introduced simultaneously into the optical path of the camera, but only alternatively. In this manner, for example, a common support and/or guidance can be provided for the first and second filter elements.

Furthermore, the filter elements can bound the movement path of the respective other filter element in a respective direction. In this manner, together with the named abutments, the movement path of a respective filter element can be bounded at both ends. In this respect, in particular the named respective abutment can represent a static boundary, whereas the respective other filter element can represent a spatially variable boundary. The filter device can in particular have operating states in which one of the filter elements is blocked between an abutment on the one side and the respective other filter element on the other side against a movement in both displacement directions possible in principle.

In an advantageous embodiment, the first filter element can be displaced between a middle parking position in which it is arranged in the optical path of the camera and a lower parking position in which it is arranged beneath the optical path of the camera. The second filter element can be displaced between a middle parking position in which it is arranged in the optical path of the camera and an upper parking position in which it is arranged above the optical path of the camera. A movement of the first filter element downwardly beyond the lower parking position can in particular be bounded by an abutment. Accordingly, a movement of the second filter element upwardly beyond the upper parking position can be bounded by an abutment.

The middle parking position of the second filter element can substantially correspond to the middle parking position of the first filter element. In addition, the lower parking position of the first filter element and the upper parking position of the second filter element can be just adjacent to the middle parking position of the respective filter element such that the displacement path between the middle parking position and the upper or lower parking position substantially corresponds to just the extent of a filter element.

If the first filter element and the second filter element are arranged in a common positional plane, three operating states of a filter unit of the filter device are thus substantially possible which differ in that the first filter element, the second filter element or none of the filter elements is arranged in the optical path of the camera. In accordance with such a further development, the first filter element is located in the optical path when the first filter element is arranged in the middle parking position and the second filter element is arranged in the upper parking position. The second filter element is arranged in the optical path when the second filter element is located in the middle parking position and the first filter element is located in the lower parking position. When the first filter element is arranged in the lower parking position and the second filter element is arranged in the upper parking position, none of the filter elements is located in the optical path.

The first filter element is advantageously blocked against a movement out of its lower parking position by the second filter element when the second filter element is located in its middle parking position. The second filter element can in a corresponding manner be blocked against a movement out of its upper parking position by the first filter element when the first filter element is located in its middle parking position. If therefore the filter device is in an operating state in which one of the filter elements is in the middle parking position, that is in the optical path of the camera, the respective other filter element is just blocked against a movement.

This block can advantageously take place by a respective abutment, anyway present, at the one side and by the respective filter element located in the optical path at the other side. It is thus ensured that the filter element which is currently not in the optical path of the camera is fixed and cannot change its position, for example due to gravity or vibrations. In this manner, it is not necessary in these operating states, in which one of the filter elements is located in the optical path, to hold the respective other filter element by means of the holding device.

The respective filter element can in this respect in particular be captured without clearance between the filter element which is located in the middle parking position and an associated abutment device to avoid any noise formation on a movement of the filter device or of the camera. Such a clearance-free encompassing can be realized in a simple manner since the magnetic coupling between the holding device and the filter element located in the middle parking position is also still sufficiently strong when the holding device has moved slightly beyond the respective holding position. By a direct overloading of the holding device, the filter element which is magnetically coupled thereto and which is located in the middle parking position can thus be applied with force-transmission against the other filter element.

The holding device can therefore in particular always only be magnetically coupled to the filter element introduced into the optical path of the camera, while the magnetic coupling to the respective other filter element is released in these operating states. A change of the operating state, i.e. in particular a change of the filter introduced into the optical path, then takes place, for example, in that first the filter element introduced into the optical path is first moved out of the optical path by the holding device by means of the magnetic coupling. The respective other filter element is thereby released for a movement out of its lower or upper parking position. The holding device can subsequently magnetically couple to this respective other filter element and displace it into the optical path of the camera, whereby the magnetic coupling to the filter element originally located in the optical path can simultaneously be released.

In accordance with an embodiment, the holding device can be displaced between an upper holding position, a middle holding position and a lower holding position, with the holding device being able to be simultaneously magnetically coupled, on the one hand, to the first filter element in its lower parking position and, on the other hand, to the second filter element in its upper parking position. The named three holding positions of the holding device can in this respect in particular correspond to the already explained operating states of a filter unit of the filter device.

The middle holding position of the holding device in this respect corresponds to an operating state in which neither the first filter element nor the second filter element is introduced into the optical path, but the filter elements are rather arranged disposed opposite one another beneath or above the optical path. In this arrangement, the holding device can simultaneously be magnetically coupled both to the first filter element and to the second filter element and can in this manner hold the filter elements in their parking positions outside the optical path. The holding device can in particular be simultaneously magnetically coupled to the first and second filter elements only in this middle holding position or in a narrow region around this middle holding position.

Alternatively or additionally to this, the holding device can only be magnetically couplable to the first filter element in a region between the middle holding position and the upper holding position to move the first filter element between its lower parking position and its middle parking position and can only be magnetically couplable to the second filter element in a region between the middle holding position and the lower holding position to move the second filter element between its upper parking position and its middle parking position.

The displacement path of the holding device thus has substantially two different regions which are separated by the middle holding position and in which only a respective one of the two filter elements can be magnetically coupled to the holding device to make a common movement with the holding device. It is achieved in this manner that always only that filter element is moved which is just to be moved out of the optical path or into the optical path, while the respective other filter element is not actively displaced. Actually due to the fact that it is avoided that the filter element is also moved which should just neither be moved into the optical path nor out of the optical path, the displacement path of the filter elements can be particularly short and the filter device as a whole can thus be particularly compact.

In accordance with a further embodiment, the filter device, in particular the actuation device of a respective filter unit of the filter device, has one or more position sensors to determine a respective position of the holding device and/or at least one of the filter elements. The operating state of the filter device can advantageously be monitored at all times by means of the position sensors, in particular when an electric drive device is used. In this respect, automatic routines can be provided in order to be able to respond to incorrect positions, for example deviations of an actual value from a desired value.

Since, in accordance with some embodiments, the magnetic coupling between a respective filter element and the holding device is selectively releasable, it is advantageous to determine the position of the filter elements in addition to the position of the holding device. In particular if the magnetic coupling between a filter element and the holding device should accidentally be released, for example by a strong mechanical blow, this release can be determined by means of the position sensors and the holding device can be displaced, for example, such that a holding magnet of the holding device is again brought into the proximity of the coupling magnet of the respective filter element to reestablish the magnetic coupling to this filter element and subsequently to guide the filter element back into the desired position.

The position sensors can, with respect to the holding device, in particular be light barriers and/or rotary encoders, for example of the named electric motor. Furthermore, to determine the position of a respective filter element, Hall sensors can be provided, for example, which can interact with the coupling magnet of a respective filter element or of a positioning magnet separately provided at the filter element. Such a magnetic position determination has the advantage that it can also be used beyond the walls of an encapsulation so that the position sensors for the filter elements can be located outside the encapsulation. Not only the position of the holding device and/or of the filter elements, but also their speed on a change of position, for example the rotational speed of the named electric motor or of a threaded spindle driven by the electric motor can advantageously be determined by means of the position sensors.

The filter element furthermore preferably comprises a plurality of filter units which are arranged behind one another with respect to the extent of the optical path. For example, two filter units each having two filter elements can be provided. If one of these four filter elements comprises clear glass to transmit the radiation unfiltered, but simultaneously to leave the optical distance unchanged, between three different filtering processes as well as no filtering process can be selected overall by means of such a filter device. Such a filter device can, for example, have three ND filters of different absorption to allow a particularly large flexibility in the setting of parameters relevant to exposure.

Filter devices are also possible which have more than two filter units and/or in which a filter unit comprises more than two filter elements. If at least two filter units are provided which are arranged behind one another with respect to the extent of the optical path, a filter element of a filter unit and a filter element of another filter unit can also be simultaneously introduced into the optical path of the camera to combine different filters with one another. The use of a plurality of filter units can in this respect allow a plurality of different filter combinations so that very many different filtering processes can be provided in a comparatively small construction space.

Some of the above-explained embodiments and advantages can also be transferred to a filter device which only comprises one single displaceable filter element. In this respect, the present invention also relates to a filter device for a camera which has an optical path, comprising at least one filter unit which has an actuation device and a filter element, wherein the actuation device has a holding device which can be magnetically coupled to the filter element, wherein the holding device can be displaced linearly to bring the filter element selectively into the optical path of the camera or to move it out of the optical path of the camera.

For example, with such a filter device, the named filter element can also be encapsulated in a housing closed with respect to the actuation device. The actuation device can in particular have an electric motor by which the holding device can, for example, be displaced in a linear manner via a reduction gear (in particular a threaded spindle of the explained kind). The magnetic coupling between the holding device and the named filter element can be selectively releasable to be able to decouple the holding device selectively from the filter element.

The invention will be described in more detail in the following only by way of example with reference to the drawings.

Figure 1A:
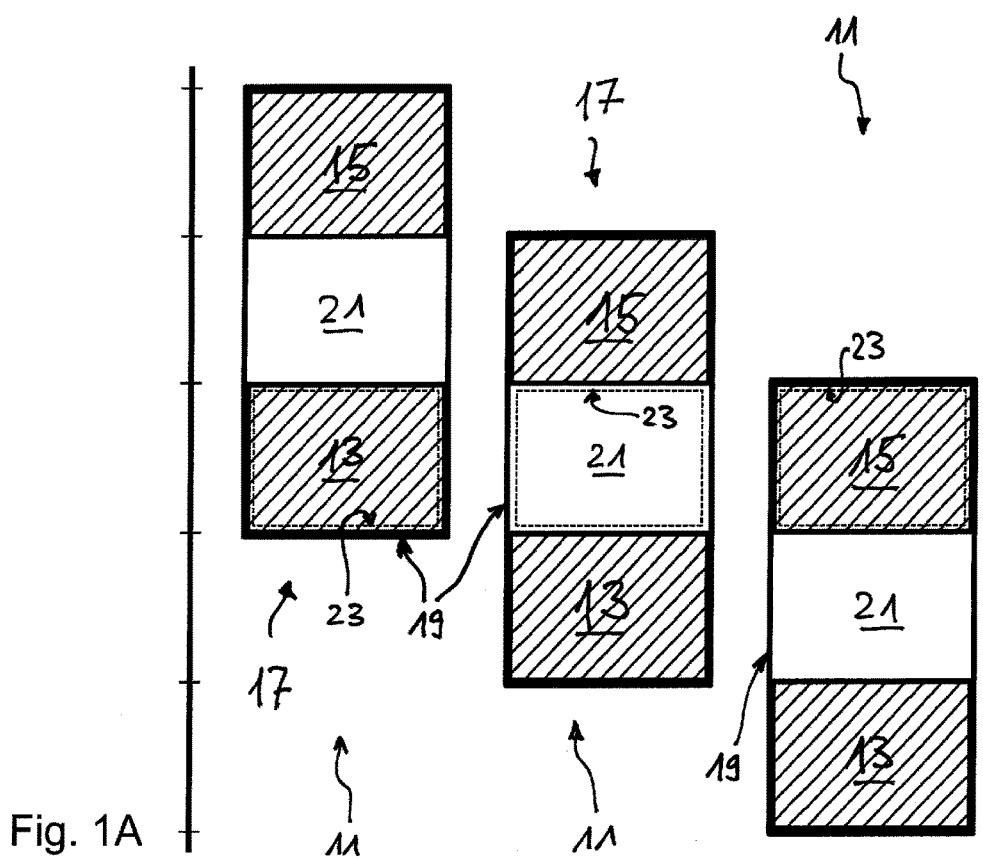
FIGS. 1A and 1B show in a schematic representation the positioning of the first and second filter elements of two different embodiments of a filter device in three respective different operating states.

Only the first filter element 13 and the second filter element 15 (each shown hatched) of a filter unit 17 of the filter device 11 shown in FIG. 1A are shown schematically. The two filter elements 13 and 15 are in this respect arranged fixed relative to one another by means of a common frame. The frame 19 holds the two filter elements 13, 15 in a common positional plane, with a free space 21 being formed between the filter elements 13, 15 which substantially corresponds to the surface of a respective filter element 13, 15 and which can optionally be filled with a clear glass filter element. The frame 19 with the filter elements 13, 15 is shown in FIG. 1A in three positions relative to the optical path 23. The optical path 23 is characterized by a dashed rectangle which defines the region in which radiation is conducted along the optical path 23 through the filter device 11 in the direction of a film section or of an image sensor of a camera (not shown).

In the operating state of the filter device 11 shown at the left, the first filter element 13 is located in the optical path 23; in the operating state shown at the right, in contrast, the second filter element 15 is arranged in the optical path 23, while in the operating state shown in the middle, none of the filter elements 13, 15 (or the named clear glass filter element) is introduced into the optical path 23. It can be recognized with respect to the scale shown at the left margin of FIG. 1A that the shown arrangement of the first filter element 13 and of the second filter element 15 makes an extent (construction space length) of at least five filter elements 13, 15 necessary in the direction of their displacement path for the setting of these three operating states. The required construction space for the total filter device 11 is thus limited downwardly to at least this extent.

Figure 1B:
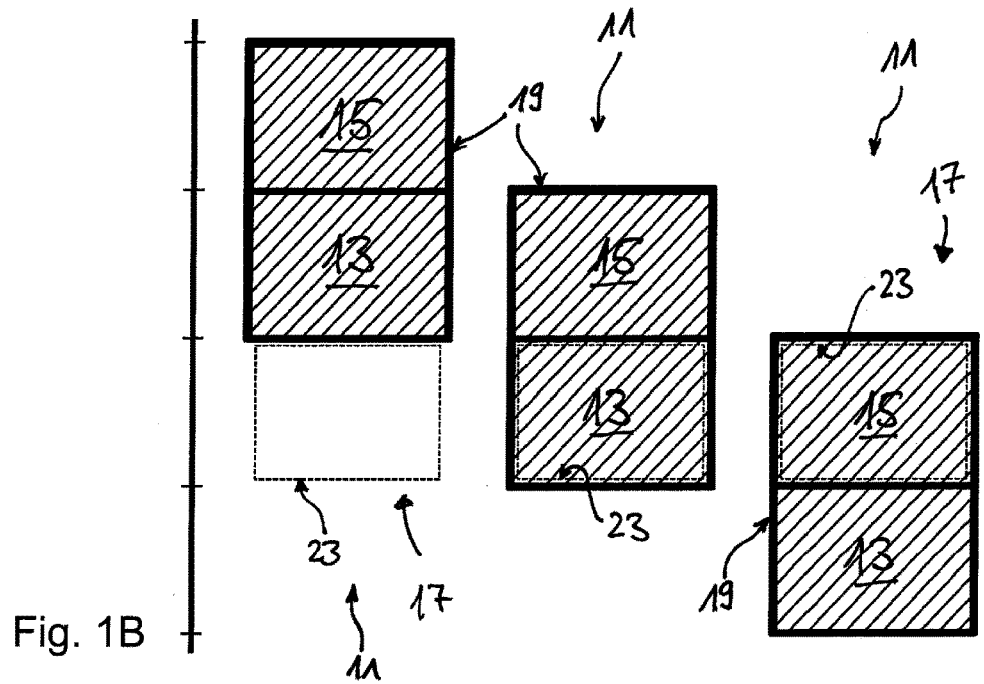

In contrast, the embodiment in accordance with FIG. 1B, in which the first filter element 13 and the second filter element 15 are arranged directly adjacent to one another relative to one another by means of the frame 19, provides the possibility of a more compact design of the filter device 11. Three operating states of the filter device 11 are likewise shown in FIG. 1B, with none of the filter elements 13, 15 being introduced into the optical path 23 at the left, the first filter element 13 being introduced in the middle and the second filter element 15 being introduced at the right. A construction space length of the filter device 11 of at least four filter elements 13, 15 (cf. the scale at the left margin of FIG. 1B) is required for the arrangement shown here of the filter elements 13, 15 relative to one another in the direction of the displacement path of the filter elements 13, 15.

In the embodiments in accordance with FIGS. 1A and 1B, the drive of the filter elements 13, 15 can take place manually or by means of an electronic drive device (e.g. by means of an electric motor) and a holding device which can be driven linearly by it and which can be magnetically coupled to the filter elements 13, 15 directly or indirectly via the common frame 19, as will be explained in the following in connection with FIGS. 2A to 2C and FIGS. 3A to 3C.

Figure 2C:
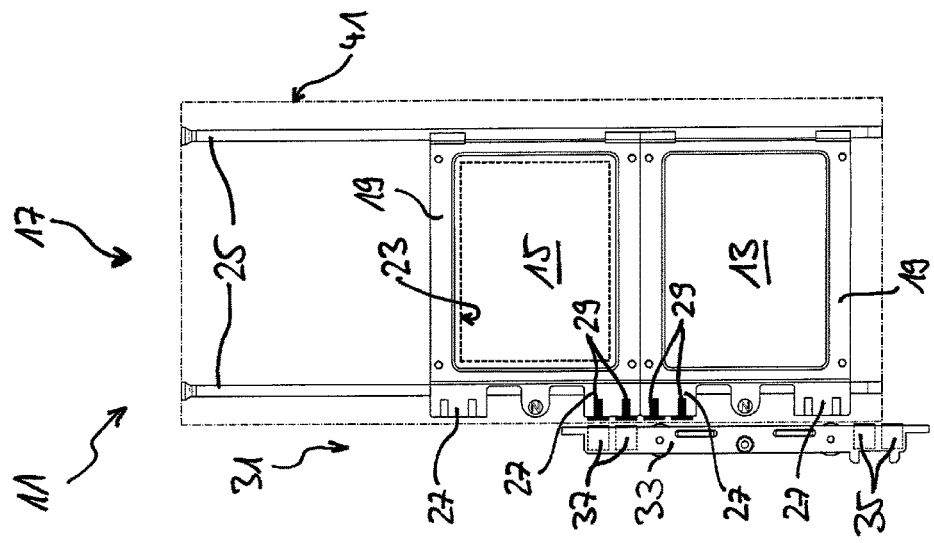
FIGS. 2A to 2C show parts of an embodiment of a filter device from a frontal view in different operating states of the filter device.
Figure 2B:
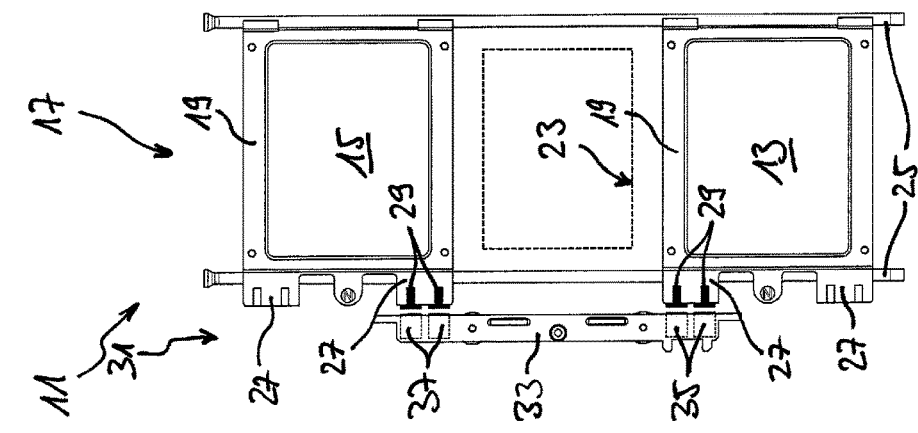
Figure 2A:
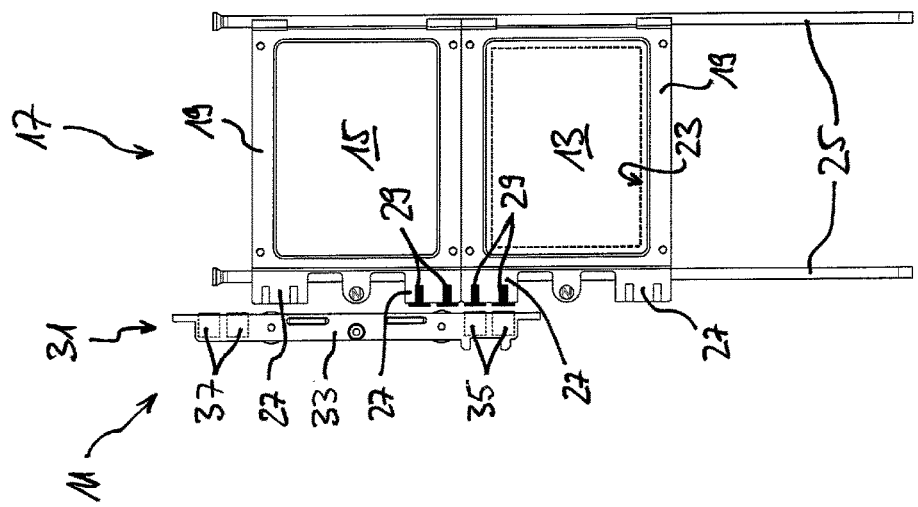

Three operating states of an embodiment of the filter device 11 are also shown in FIGS. 2A to 2C, with in contrast to the embodiments of FIGS. 1A and 1B, the first filter element 13 and the second filter element 15 not being arranged rigidly relative to one another. The first filter element 13 and the second filter element 15 rather have a respective separate frame 19 of their own. The first filter element 13 and the second filter element 15 are linearly movably supported in a common positional plane at two sliding bars 25 by means of their respective frames 19. In principle, one filter element 13, 15 can in this respect substantially slide along the total extent of the sliding bars 25. Since the two filter elements 13, 15 are arranged in the same positional plane, the displacement path of a respective filter element 13, 15 is, however, bounded by the respective other filter element 13, 15 and is dependent on its respective current position.

Figure 3C:
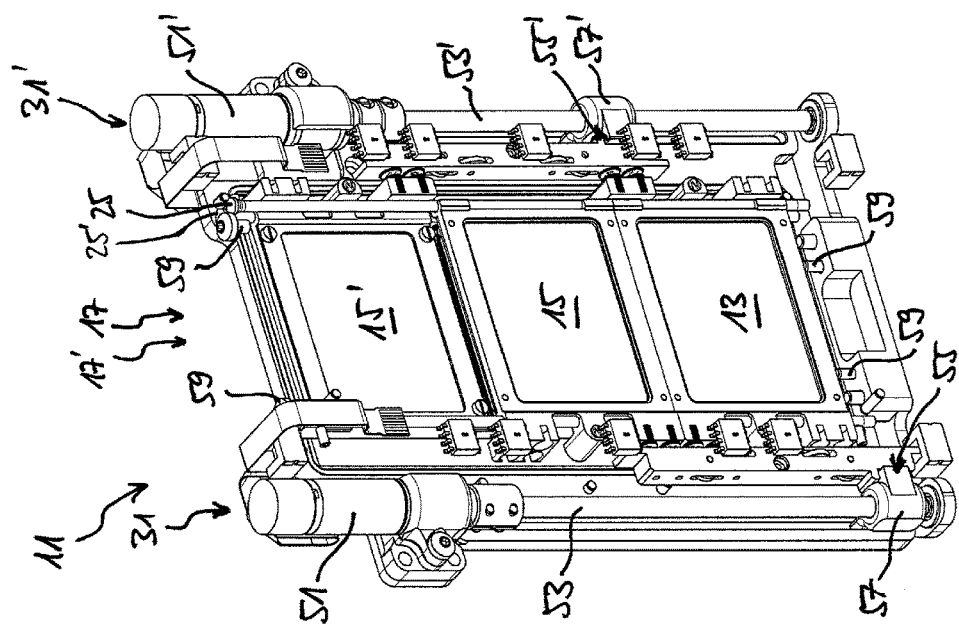
FIGS. 3A to 3C show the embodiment shown in FIGS. 2A to 2C with respective further components, with FIGS. 3B and 3C being shown in a perspective view.

A movement of the filter elements 13, 15 beyond the length of the sliding bars 25 is moreover bounded at both sides of the movement path (in FIGS. 2A to 2C: upwardly or downwardly respectively) by abutments 59 (not shown here: cf. FIG. 3C). As can be seen from FIGS. 2A to 2C, the first filter element 13 is movable between a middle parking position (FIG. 2A) and a lower parking position (FIGS. 2B and 2C), while the second filter element 15 is movable between a middle parking position (FIG. 2C) corresponding to the middle parking position of the first filter element 13 and an upper parking position (FIGS. 2A and 2B). The middle parking position of the filter elements 13, 15 respectively corresponds to an arrangement of the filter element 13, 15 in the optical path 23. The lower parking position and the upper parking position are in contrast arranged beneath or above the optical path 23.

Mounts 27 are provided at a side of the frame 19 of a respective filter element 13, 15 (in FIGS. 2A to 2C: left). With the first filter element 13, a coupling magnet 29 is arranged in an upper mount 27 and is configured in the embodiment shown as two neodymium magnets arranged next to one another. A lower mount 27 of the filter element 13 is in contrast empty and does not have any magnets. The frame 19 of the second filter element 15 is configured identical with the frame 19 of the first filter element 13. With the second filter element 15, however, a coupling magnet 29, again configured in two parts, is arranged in the lower mount 27, while the upper mount 27 is empty.

The respective coupling magnet 29 is therefore not arranged at the same relative position with the first filter element 13 and the second filter element 15, but rather in each case in a corner region of the respective filter element 13, 15 facing the respective other filter element 13, 15. Such an arrangement contributes to a particularly compact construction shape of the filter device 11. For if the two filter elements 13, 15 are arranged at mutually oppositely disposed sides of the optical path 23 and are thus spaced apart from one another at a maximum (cf. FIG. 2), the coupling magnets 29 have in this regard a small maximum spacing from one another in that this spacing only amounts to slightly more than the spacing of the two filter elements 13, 15. In this manner, a holding device cooperating with both holding magnets 29 does not need to be longer than this spacing, as will also be explained in the following.

The filter unit 17 of the filter device 11 shown in FIGS. 2A to 2C comprises an actuation device 31 having a holding device 33 which is disposed opposite the coupling magnets 29 of the filter elements 13, 15. The actuation device 31 furthermore comprises an electric motor 51, 51' (not shown: cf. FIG. 3C) by means of which the holding device 33 can be displaced in a linear manner and in parallel with the movement path of the filter elements 13, 15. The displacement path of the holding device 33 in this respect extends from an upper holding position (FIG. 2a) via a middle holding position (FIG. 2B to a lower position (FIG. 2C).

The holding device 33 has a first holding magnet 35 and a second holding magnet 37 (shown dashed in part) which are arranged at mutually oppositely disposed ends of the holding device 33 which are elongate and, like the coupling magnets 29 of the filter elements 13, 15, comprise a respective arrangement of two individual neodymium magnets. The spacing between the two holding magnets 35, 37 (and thus also the length of the holding device 33) in this respect corresponds to just the named maximum spacing which the coupling magnets 29 of the first and second filter elements 13, 15 adopt when, as shown in FIG. 2B, the first filter element 13 is arranged in the lower parking position and the second filter element 15 is arranged in the upper parking position. In this state, the holding device 33 in its middle holding position can be magnetically coupled via the named holding magnets 35, 37 and coupling magnets 29 both to the first filter element 13 and to the second filter element 15. For this purpose, the length of the holding device 33 only has to amount to a little more than the height of a filter element 13, 15 due to the arrangement of the coupling magnets 29 so that the holding device projects only slightly beyond the upper or lower parking positions respectively of the respective filter element 13, 15 in the upper holding position (FIG. 2A) and in the lower holding position (FIG. 2C). It is thereby made possible to give the filter device 11 a particular compact design.

Starting from this middle holding position (FIG. 2B), the holding device 33 can be displaced into the upper holding position (FIG. 2A) or into the lower holding position (FIG. 2C). If the holding device 33 is displaced into the upper holding position, the first filter element 13 is taken along by the holding device 33 due to the magnetic coupling and is displaced into the middle parking position, that is into the optical path 23. The second filter element 15 can, in contrast, not be displaced further upwardly from its upper parking position due to the abutment 59 (cf. FIG. 3C) and therefore remains in the upper parking position. The displacing of the holding device 33, however, has the result that the spacing between the second holding magnet 37 and the coupling magnet 29 of the second filter element 15 increases and thus the magnetic coupling between the holding device 33 and the second filter element 15 is released. If the holding device 33 is located in the upper parking position, the second filter element 15 is thus no longer held by the holding device 33. The movability of the second filter element 15 in this operating state (FIG. 2A) is, however, bounded upwardly by the named abutment 59 (cf. FIG. 3C) and is bounded downwardly by the first filter element 13 displaced into the middle parking position so that the second filter element 15 is held tight in the upper parking position.

The transition from the operating state shown in FIG. 2B to the operating state shown in FIG. 2C takes place due to the symmetrical design in accordance with the described transition from the operating state shown in FIG. 2B to the operating state shown in FIG. 2A, with in this case the second filter element 15 conversely being displaced by the holding device 33 from the upper parking position into the middle parking position into the optical path 23, while the first filter element 13 is magnetically decoupled from the holding device 33 due to the lower abutment 59 (cf. FIG. 3C) and remains in its lower parking position.

It can also easily be seen from FIGS. 2A to 2C that the holding device 33 only has to be displaced from the lower holding position into the middle holding position for a transition from the operating state shown in FIG. 2C to the operating state shown in FIG. 2B. The holding device 33, in contrast, first has to be displaced from the upper holding position into the lower holding position for a transition from the operating state shown in FIG. 2A to the operating state shown in FIG. 2B, with the holding device 33 "capturing" the second filter element 15 by means of the second holding magnet 37 so that the operating state shown in FIG. 2C is achieved. The holding device 33 can then be displaced into the middle holding position.

The possible displacement path of a respective filter element 13, 15 from the middle parking position into the lower or upper parking position (and back) is thus substantially shorter than the maximum displacement path of the holding device 33 which extends from the upper holding position to the lower holding position. A respective filter element 13, 15 is therefore not moved any further than just required for the purpose of introducing the filter element 13, 15 into the optical path 23 or for the purpose of releasing the optical path 23. Since the magnetic coupling between the holding device 33 and a respective filter element 13, 15 can be released by means of the abutments 59 (cf. FIG. 3C), a single holding device 33 can be used for both filter elements 13, 15. In this respect, the holding device 33 can have a continuous linear displacement path, with it only being able to be magnetically coupled to the first filter element 13 in the upper half of the displacement path and only to the second filter element 15 in the lower half of the displacement path to make a common movement.

This section-wise decoupling ability by displacing to a respective abutment 59 (cf. FIG. 3C) allows a particularly compact design of the filter device 11, in particular in comparison with FIGS. 1A and 1B. A minimal construction space length of substantially only three filter elements is required in the displacement direction of the filter elements 13, 15.

The named arrangement of the coupling magnets 29 at the filter elements 13, 15 and of the holding magnets 35, 37 at the holding device 33 moreover contributes to a compact design of the filter device 11 which makes it possible that the holding device 33 itself only has to be slightly longer than a respective filter element 13, 15 (cf. in particular FIG. 2B). The construction space length which the holding device 33 takes up for a displacement between its upper holding position and its lower holding position also in this manner only slightly exceeds the length of three filter elements.

A housing 41 which forms an encapsulation of the filter elements 13, 15 with respect to the actuation device 31 with the holding device 33 is shown schematically by a chain-dotted line in FIG. 2C. The filter elements 13, 15 are encapsulated in a closed space by corresponding walls of the housing 41, beyond which walls the magnetic coupling between the coupling magnets 29 of a respective filter element 13, 15 and the respective holding magnet 35, 37 of the holding device 33 can take place and are thus protected from contaminants, in particular from abrasion from the actuation device 31.

Figure 3B:
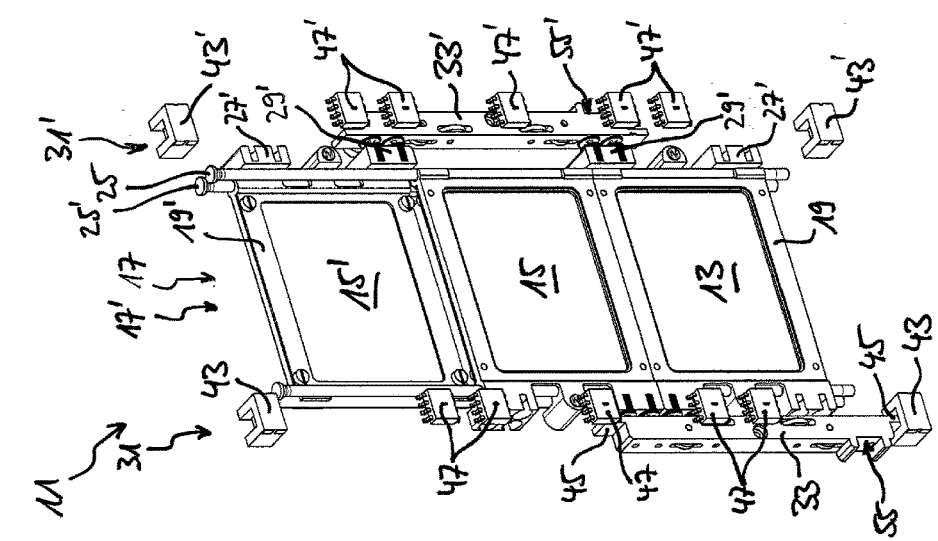
Figure 3A:
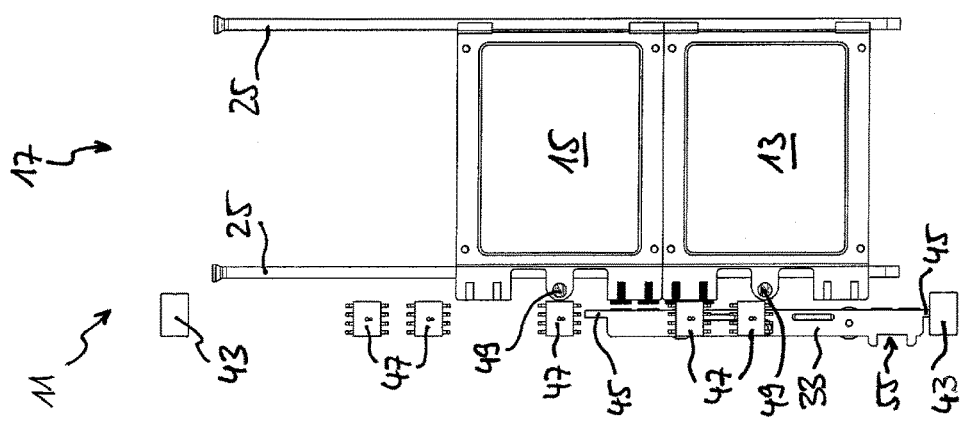

The embodiment shown in FIG. 2C is also shown in FIG. 3A (without the housing 41), with here additional position sensors 43, 47 being shown which are associated with the actuation device 31. In this respect, it is, on the one hand, a question of light barriers 43 which are arranged at a respective end of the displacement path of the holding device 33 and via which it can be determined whether the holding device 33 is located in its upper holding position or in its lower holding position. For this purpose the holding device 33 has a respective prolongation 45 at its ends which interrupts a respective light barrier 43 when the holding device 33 is located in the upper or lower holding position.

Hall sensors 47 are arranged as further positions sensors along the displacement path of the holding device 33 and cooperate with a respective position magnet 49 within the frame 19 of a respective filter element 13, 15. The spacing of one of the position magnets 49 from the Hall sensor 47 can be determined by means of a respective Hall sensor 47. It is thus possible due to the distributed arrangement of the Hall sensors 47 to continuously determine the position of a respective filter element 13, 15 over the total length of its respective possible displacement path.

If, for example, a magnetic coupling between one of the filter elements 13, 15 and the holding device 33 should accidentally be released so that the filter element 13, 15 either does not move even though it ought to be displaced by the holding device 33 or if it moves, for example due to gravity even though it should be held unmovably by the holding device 33, this can be determined by means of the Hall sensors 47. The holding device 33 can, for example, thereupon be driven by means of the electric motor 51, 51' to make a movement routine by which the respective holding magnet 35, 37 is again brought into the proximity of the coupling magnet 29 of the respective filter element 13, 15 to reestablish the magnetic coupling and subsequently the respective filter element 13, 15, is conducted back into the actually desired position. The position of the holding device 33 itself can, for example, be determined by means of further position sensors, for example the rotary encoder associated with the electric motor 51, 51' (cf. FIG. 3C) displacing the holding device 33.

In FIG. 3B, the embodiment of the filter device 11 shown in FIG. 3A is shown in a perspective view, with here, in addition to the filter unit 17 shown in FIGS. 2A to 2C and 3A, a further filter unit 17' of the filter device 11 being shown which is arranged behind the filter unit 17 with respect to the extent of the optical path. The design of this further filter unit 17' substantially corresponds to that of the filter unit 17. However, the mounts 27' for the coupling magnets 29' at the frames 19' of the first and second filter elements 13', 15' of the further filter unit 17' as well as the associated actuation device 31' (of which only the holding device 33' is shown) are arranged in comparison with the filter unit 17 at the oppositely disposed side (with respect to the optical path 23, i.e. at the right in FIG. 3B).

The filter device 11 is located in an operating state in FIG. 3B in which the second filter element 15 of the filter unit 17 is introduced into the optical path 23, while none of the filter elements 13', 15' of the further filter unit 17' is located in the optical path 23. It is rather the case that the first and second filter elements 13', 15' are held in their upper and lower parking positions respectively by the holding device 33' to which it is magnetically coupled. Only a respective one of the filter elements 13, 15, 13', 15' is preferably always present in the optical path 23 to prevent the optical distance of the optical path 23 from changing by a change of the filter element 13, 15, 13', 15' introduced into the optical path 23. To allow radiation to pass through the filter device 11 unfiltered in one of the possible operating states of the filter device 11, the first filter element 13 of the filter unit 17 is clear glass, for example. The remaining filter elements 15, 13', 15' are ND filters of different densities.

In FIG. 3C, the embodiment of the filter device 11 shown in FIG. 3B is shown with in turn further components, with in particular the housing 41 which separates the filter elements 13, 15, 13', 15' spatially from the actuation devices 31, 31' (cf. FIG. 2C) still not being shown, however. In FIG. 3C, in particular the electric motors 51, 51' of the filter units 17, 17' can be recognized which each drive a threaded spindle 53, 53' to make a rotational movement about its respective axis. The holding devices 33, 33' have a respective engagement section 55, 55' into which a respective nut 57, 57' provided with an internal thread engages. The named threaded spindles 53, 53' extend through a respective nut 57, 57' so that on a rotation of the threaded spindle 53, 53', the nut 57, 57' is displaced linearly along the respective threaded spindle 53, 53' in dependence on the direction of rotation and in this respect displaces the respective holding device 33, 33' linearly via the respective engagement section 55, 55'. The threaded spindle 53, 53' in this manner forms a reduction gear of the respective actuation device 31, 31' for transferring the rotational movement of the electric motor 51, 51' to the holding device 33, 33', with the reduction depending on the selected pitch of the mutually interacting threads of the nuts 57, 57' and of the threaded spindles 53, 53'.

The displacement path of the holding devices 33, 33' is in particular limited by the length of the threaded spindle 53, 53'. The movement path of the filter elements 13, 15, 13', 15' along the sliding bars 25, 25' is, in contrast, limited by separately provided abutments 59 which are formed as pins (bottom) or screw shafts (top).

Overall, FIG. 3C illustrates that the filter device 11 in accordance with the invention makes it possible to position a plurality of different filter elements 13, 15, 13', 15' precisely in a very small construction space and to introduce them selectively into the optical path 23, with simultaneously a contamination of the filter elements 13, 15, 13', 15' being able to be reliably avoided by the housing 41 (shown in FIG. 2C). The compact construction space of the filter device 11 with the encapsulation of the dirt-sensitive components, in particular of the filter elements 13, 15, 13', 15', moreover allows a particularly simple replaceability of the total filter device 11.

REFERENCE NUMERAL LIST 11 filter device
13, 13' first filter element
15, 15' second filter element
17, 17' filter unit
19, 19' frame
21 free space
23 optical path
25, 25' sliding bar
27, 27' mount
29, 29' coupling magnet
31, 31' actuation device
33, 33' holding device
35 first holding magnet
37 second holding magnet
41 housing
43, 43' light barrier
45 prolongation
47, 47' Hall sensor
49 position magnet
51, 51' electric motor
53, 53' threaded spindle
55, 55' engagement section
57, 57' nut
59 abutment

What is claimed is:

1. A filter unit for a camera, comprising:
at least a first filter element and a second filter element that are moveable along a movement path,
a housing, and
a holding device that is displaceable in parallel with the movement path;
wherein the first filter element and the second filter element are located inside the housing and the holding device is located outside the housing; and
wherein the holding device is configured to be magnetically coupled to at least one of the first filter element and the second filter element for a common movement, wherein the holding device selectively drives the at least one of the first filter element and the second filter element into a desired position by magnetic interaction from outside the housing as the holding device is displaced.

2. The filter unit in accordance with claim 1,
wherein the holding device comprises at least one holding magnet,
wherein the at least one of the first filter element and the second filter element comprises at least one coupling magnet, and wherein the magnetic interaction is established between the at least one holding magnet and the at least one coupling magnet.

3. The filter unit in accordance with claim 2,
wherein one of the at least one holding magnet and the at least one coupling magnet comprises a permanent magnet, wherein the other of the at least one holding magnet and the at least one coupling magnet comprises an induced magnet.

4. The filter unit in accordance with claim 1,
wherein the first filter element and the second filter element are located in an inner space of the housing, wherein the inner space of the housing is hermetically sealed.

5. The filter unit in accordance with claim 1,
wherein the filter unit comprises an electric motor which drives the holding device.

6. The filter unit in accordance with claim 5,
wherein the filter unit further comprises a reduction gear that is provided between the electric motor and the holding device.

7. The filter unit in accordance with claim 6,
wherein the reduction gear has a threaded spindle that is driven by the electric motor to make a rotational movement, with the holding device being supported movably, but fixed rotationally, in parallel with the axis of rotation of the threaded spindle and having an internal thread in engagement with the threaded spindle.

8. The filter unit in accordance with claim 1,
wherein the holding device is configured to be displaced manually.

9. The filter unit in accordance with claim 1,
wherein the magnetic coupling between the holding device and the respective filter element is selectively releasable.

10. The filter unit in accordance with claim 1,
wherein a possible displacement path of the filter elements is selected to be shorter than a maximum displacement path of the holding device so that the magnetic coupling between the holding device and the respective filter element can be selectively released by displacing the holding device beyond the possible displacement path of one of the filter elements.

11. The filter unit in accordance with claim 10,
wherein the possible displacement path of the respective filter element is bounded by at least one abutment at an end of the displacement path of the filter element.

12. The filter unit in accordance with claim 1,
wherein the holding device has a first holding magnet and a second holding magnet, wherein the first filter element has a coupling magnet and the second filter element has a coupling magnet,
wherein the first holding magnet can be coupled to the coupling magnet of the first filter element, and wherein the second holding magnet can be coupled to the coupling magnet of the second filter element.

13. The filter unit in accordance with claim 12,
wherein a spacing between the first holding magnet and the second holding magnet of the holding device corresponds to a spacing between the coupling magnet of the first filter element and the coupling magnet of the second filter element when the first filter element and the second filter element are spaced apart from one another.

14. The filter unit in accordance with claim 1,
further comprising a frame that holds the first filter element and the second filter element in a fixed arrangement relative to one another.

15. The filter unit in accordance with claim 14,
wherein the holding device comprises at least one holding magnet,
wherein the at least one of the first filter element and the second filter element comprises at least one coupling magnet, and wherein the magnetic interaction is established between the at least one holding magnet and the at least one coupling magnet.

16. The filter unit in accordance with claim 14,
wherein the holding device is configured to be magnetically coupled to the at least one of the first filter element and the second filter element indirectly via the frame.

17. The filter unit in accordance with claim 1,
wherein the first filter element and the second filter element are arranged in a common plane.

18. The filter unit in accordance with claim 1,
wherein one of the first filter element and the second filter element is a clear glass filter element.

19. A filter device comprising a plurality of filter units in accordance with claim 1, the plurality of filter units being arranged behind one another.

20. A camera comprising the filter unit in accordance with claim 1,
wherein the holding device is configured to selectively drive one of the first filter element and the second filter element into an optical path.

\* \* \* \* \*